March 11, 1958 L. B. EVANS 2,826,462
BEARING ALIGNMENT ADJUSTOR
Filed March 31, 1955 3 Sheets-Sheet 1

INVENTOR
L. B. EVANS
BY
Maybee & Legris
ATTORNEYS

March 11, 1958  L. B. EVANS  2,826,462
BEARING ALIGNMENT ADJUSTOR
Filed March 31, 1955  3 Sheets-Sheet 2

INVENTOR
L. B. EVANS
BY
Maybee & Legris
ATTORNEYS

March 11, 1958 L. B. EVANS 2,826,462
BEARING ALIGNMENT ADJUSTOR
Filed March 31, 1955 3 Sheets-Sheet 3

INVENTOR
L. B. EVANS
BY
Maybee & Legris
ATTORNEYS

500
United States Patent Office 2,826,462
Patented Mar. 11, 1958

2,826,462

BEARING ALIGNMENT ADJUSTOR

Leighton Bernard Evans, Toronto, Ontario, Canada, assignor to Orenda Engines Limited, Malton, Ontario, Canada, a corporation Application March 31, 1955, Serial No. 498,392

8 Claims. (Cl. 308—62)

This invention relates to a device for adjusting the alignment of axes.

In particular, the device has found application in aligning the axis of the center bearing of the main shaft of a gas turbine engine with the axis of the front bearing. While during this description, and in the drawings, the device will be described and illustrated in conjunction with a gas turbine engine, it will be appreciated that the device has application in the bearing art generally, and is not limited to the specific function disclosed.

The problem of aligning the center and front bearings in a gas turbine engine arises from the accumulation of unavoidable manufacturing tolerances. The center bearing is supported by a radial web bolted to the center casting which is in turn bolted to the after end of the compressor casing. The air intake casting, in the center of which is mounted the front bearing, is bolted to the forward end of the compressor casing. It will be appreciated that the manufacturing tolerances at each of the many joints can be the cause of axial misalignment between the center and front bearings. This misalignment of the axes of the bearings which results from the accumulation of the manufacturing tolerances is usually of an angular nature. In other words, the axis of one bearing lies at an angle to the axis of the other bearing even though the centers of the bearings may be in perfect alignment.

This misalignment can be accommodated, in production assembly, by machining the abutting faces of mating parts until the bearings are in true angular axial alignment. Shims can also be used. However, it is first necessary to assemble these components before the amount of misalignment can be determined. The parts must then be dismantled and various faces machined or shimmed to bring the misalignment to within the prescribed limits. The components must then be reassembled. It will be understood that these disadvantages arising from such trial and error measures cannot be overcome by using a conventional self-aligning bearing for the center bearing because a self-aligning bearing cannot transmit the high thrust loads. The above mentioned disadvantages are tolerated in production because until the time of the present invention, no suitable solution to the problem had yet been devised. However, the problem is further aggravated by the necessity of dismantling the engine for overhaul or repair. When such operations become necessary it will be appreciated that, on reassembly of the engine, misalignment of the bearings could again result. More important, interchangeability of major components is seriously effected because the faces of certain of the replacement main structural castings would have to be machined to accommodate the bearing misalignment. Since machining of this type is generally outside the scope of normal field service or overhaul operations, in most instances the engine would have to be returned to the factory for reassembly.

It is an object of this invention to provide a bearing alignment adjuster which will enable the angular adjustment of the axis of a bearing without machining and without the use of shims.

It is another object of this invention to provide a bearing alignment adjuster which may be easily inserted in and removed from the supporting structure.

It is another object of this invention to provide a bearing alignment adjuster which will enable the angular adjustment of a bearing axis without disassembling the apparatus.

It is another object of this invention to provide a bearing alignment adjuster which can be rigidly locked in the desired setting.

In the accompanying drawings which illustrate the preferred embodiment of the invention, like reference numerals denote like parts throughout the various views and:

Figure 1:
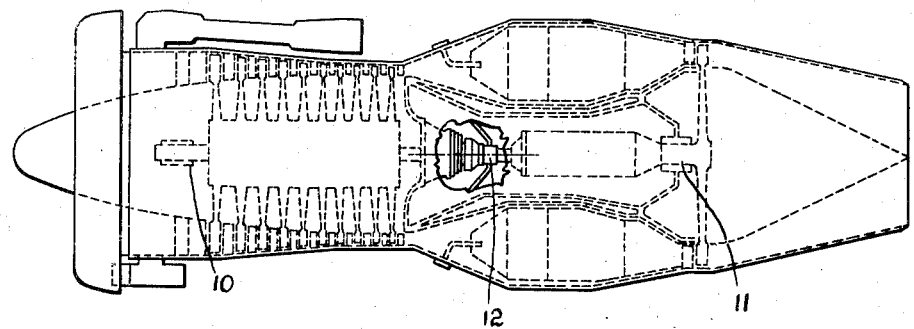
Fig. 1 is a side elevation of a gas turbine engine employing an embodiment of the present invention.

Referring now to the drawings, a gas turbine engine will be seen in Fig. 1 having a front bearing 10, a rear bearing 11 and a center bearing 12 made in accordance with this invention.

The center bearing 12 is mounted within a radial web 13 and comprises an inner sleeve 14, inner races 15, balls 16, outer races 17 and an outer sleeve 18. The shaft 19 fits within the inner sleeve 14 and the bearing alignment adjuster which is the subject of the present invention fits about the outer sleeve 18 between that sleeve and the radial web 13.

The bearing alignment adjuster itself consists of three parts, an outer sleeve, an intermediate sleeve, and an inner sleeve. For convenience in the following description the outer sleeve will be termed A, the intermediate sleeve B, and the inner sleeve, C. Portions of each of these sleeves will be denoted by reference numerals followed by a letter A, B or C to identify the sleeve with which the portion is associated.

Figure 5:
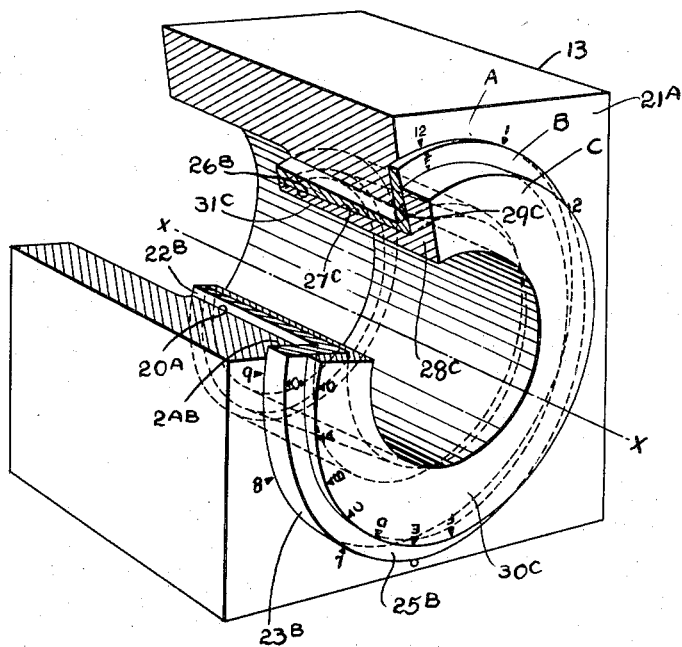
Fig. 5 is a segmented perspective view of another embodiment of the adjuster.

In the embodiment illustrated in the accompanying drawings the outer sleeve A is not a separate sleeve but is the radial web 13. This web 13 has a cylindrical bore having a side wall 20A and an end face 21A which is at right angles to the surface of the side wall 20A. While it is, in the embodiment illustrated, convenient to employ the bore of the web 13 as the outer sleeve, it will be appreciated that in other applications of the device it may be desirable to employ a separate sleeve which may be mounted in a supporting structure. In such a case the outer sleeve A will have a cylindrical bore and one end face at right angles to the bore. The outer surface of the sleeve may be of any shape convenient for mounting in a supporting structure. Such an embodiment is shown in Fig. 5.

The intermediate sleeve B has a cylindrical outer surface 22B which is a sliding fit within the bore of outer sleeve A. At one end of intermediate sleeve B is an outwardly extending peripheral flange 23B having a face 24B which is at right angles to the outer surface 22B of the sleeve. The opposite surface of flange 23B, namely surface 25B is not parallel to surface 24B but is normal to the inner surface 26B of the intermediate sleeve. This inner surface 26B is cylindrical and lies at an angle to the outer surface 22B. As will be seen from Figs. 2, 3 and 4, the flange 23B is of varying thickness, proceeding from a point of minimum thickness on its periphery to a point of maximum thickness located diametrically from the said point of minimum thickness.

The inner sleeve C has an outer surface 27C which fits within the bore of the intermediate sleeve B. At one end of the sleeve C is an outwardly extending peripheral flange 28C which has a face 29C adapted to lie against face 25B of the intermediate flange and an outer face 30C which is normal to the inner surface 31C of the inner sleeve C. The bore of the inner sleeve C is, in the preferred embodiment cylindrical and lies at an angle to the axis of the outer wall 27C equal to the angle between walls 22B and 26B of the intermediate sleeve. It will be appreciated, of course, that the bore of the inner sleeve could be of any cross-sectional shape. The flange 28C of the inner sleeve is of varying thickness and proceeds from a point of minimum thickness to a point of maximum thickness diametrically opposed to said point of minimum thickness.

Figure 2:
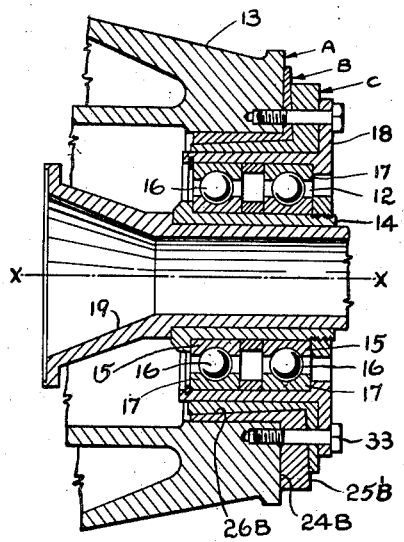
Fig. 2 is a cross section of a bearing assembly in the "normal" position.

From Fig. 2 it will be seen that when the device is in the position shown, the axis of the inner sleeve which is designated by the line X—X is parallel to and colinear with the axis of the outer sleeve A. In this position the angularity of the bore of the intermediate sleeve B with respect to the axis X—X is counteracted by the angularity of the outer surface of the inner sleeve C. If, however, the inner sleeve C were rotated through 180° then the angularity of sleeve C would be added to the angularity of sleeve B and the resultant axis of sleeve C would lie along line X—X of Fig. 4.

Figures 3, 3A:
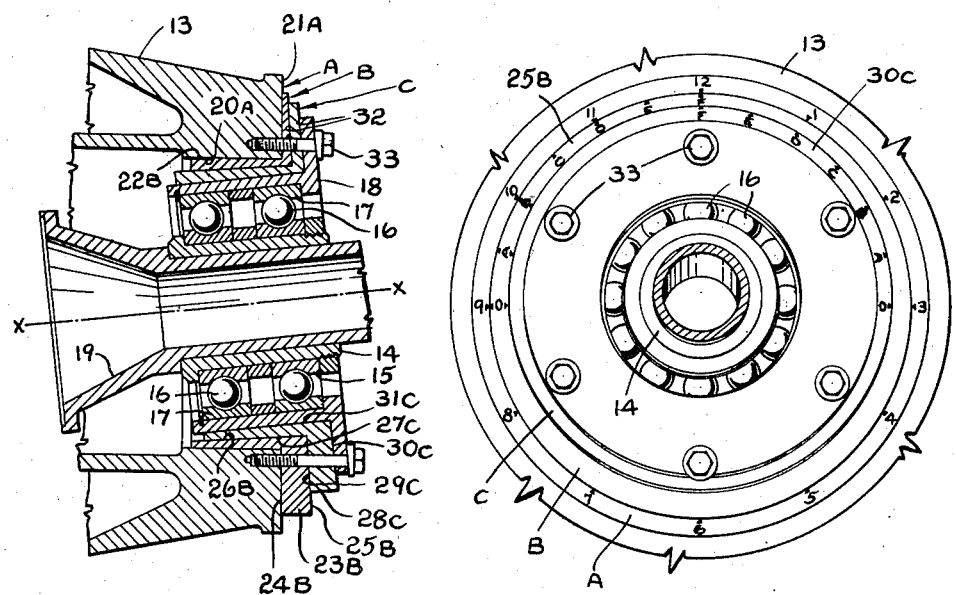
Fig. 3 is a cross section of the bearing assembly of Fig. 2 in a second position.
Fig. 3a is a front elevation of Fig. 3.
Figure 2A:
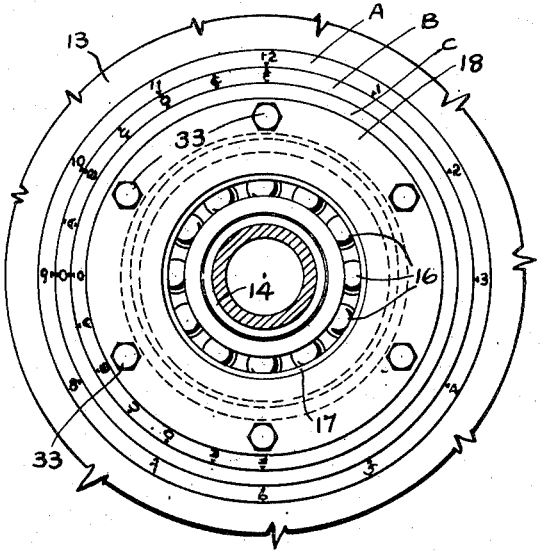
Fig. 2a is a front elevation of Fig. 2.
Figure 4:
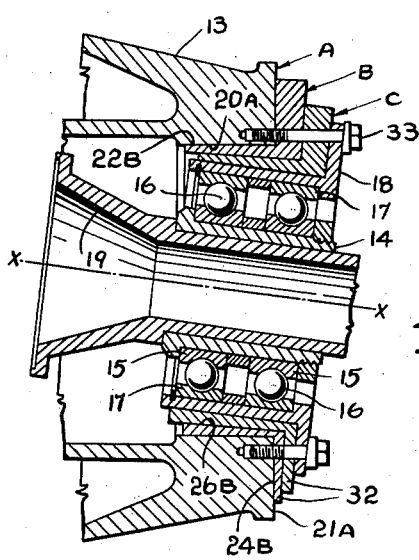
Fig. 4 is a cross section of the bearing assembly of Fig. 2 in a third position.
Figure 4A:
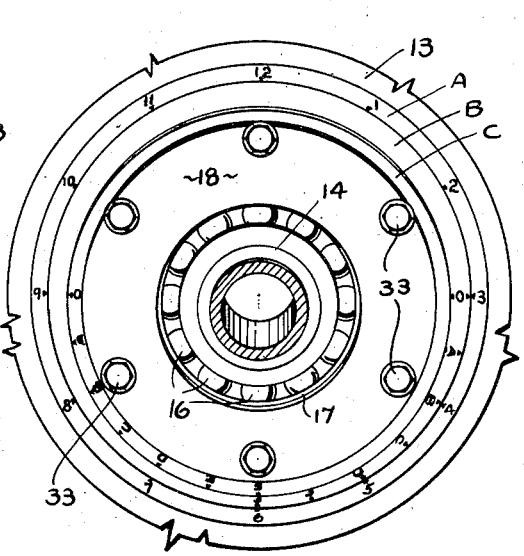
Fig. 4a is a front elevation of Fig. 4.

In Figs. 2, 3 and 4 the faces of the sleeves are shown with graduations marked thereon. Outer sleeve A is marked with graduations reading from 1 to 12 spaced 30° apart around its periphery. Face 25B of sleeve B is marked in graduations from zero to F through 90° each graduation representing 15° of arc. These graduations are marked in a clockwise direction. Face 30C of inner sleeve C is marked in 15° graduations through 90° from zero to F in a counterclockwise direction. Fig. 2a is an end view of the device shown in cross-section in Fig. 2. It will be seen that when the graduation zero on scale C is set opposite graduation zero on scale B that the axis of the central bore will be parallel to and co-linear with the axis of the outer sleeve. If, however, the inner sleeve C is rotated through 180° so that graduation F of sleeve C is opposite graduation F on sleeve B, then the angular displacement of the axis X—X will be at the maximum. (See Figs. 3 and 4.) If the graduations F are set adjacent one another on sleeves B and C and adjacent graduation 12 on sleeve A then the angular displacement of the axis X—X will be in the direction of graduation 12 on sleeve A. This is shown clearly in Figs. 3 and 3a. If the graduations F are on sleeves B and C are set opposite one another and opposite graduation 6 on sleeve A then the inclination of axis X—X will be at its maximum in the direction of graduation 6 on sleeve A. This is clearly shown in Figs. 4 and 4a. The angular adjustment of axis X—X can be varied between zero and the maximum by setting the graduations on sleeve C adjacent greater or lesser graduations on sleeve B. The direction of the angular displacement of the axis can be adjusted by setting the graduations on sleeve B and C adjacent the appropriate graduations on sleeve A.

The angular displacement of axis X—X is, of course, a function of the angular displacement of sleeve C with respect to sleeve B. This may be expressed as $D = F \sin N$ where D is the angular displacement of the axis X—X with respect to the normal, and is the angle through which sleeve C has been rotated with respect to sleeve B.

The device which has been described above can be manufactured to effect various angular displacements of the axis X—X by varying the angle formed by walls 22B and 26B and the walls 27C and 31 of the inner sleeve C. If these angles are larger than that shown in Figs. 2, 3 or 4, then the maximum displacement of the axis X—X will be greater. Conversely, if these angles are smaller then the maximum angular displacement of axis X—X will also be smaller.

When the bearing has been axially adjusted so that its axis is angularly aligned with the axis of the adjacent bearing by rotating sleeves B and C relative to one another and relative to the casing, holes 32 are drilled through the bearing flange 18, flange 28C of the inner sleeve, flange 23B of the intermediate sleeve and into the radial web 13. These holes are then tapped to receive bolts or studs 33 which is threaded therein thus locking both sleeves and the casting against relative rotation and ensuring that the axis of the bearing will remain fixed.

While in the foregoing description specific terms have been used and the device has been described with respect to its application to a gas turbine engine, it is to be appreciated that the device may be used anywhere it is required that the axis be adjustable angularly with respect to a fixed point. Minor modifications may be made in the device within the scope of the appended claims.

What I claim as my invention is:

1. A bearing alignment adjuster comprising at least two sleeves one within the other rotatable relative to one another and mounted for rotation in a supporting member, the inner and outer surfaces of each sleeve being cylindrical but non-parallel.

2. A bearing alignment adjuster comprising a mounting structure having a sleeve rotatable therein, a second sleeve rotatable in the first sleeve, the inner and outer surfaces of each sleeve being cylindrical but non-parallel.

3. A bearing alignment adjuster comprising at least two sleeves one within the other rotatable one within the other and mounted for rotation in a supporting member, the outer surface and the inner surface of the inner and outer sleeves respectively being in sliding contact and the outer and inner surfaces of the outer sleeve and the supporting member being in sliding contact, the inner and outer surfaces of the two sleeves being cylindrical but non-parallel.

4. A device for altering the inclination of an axis comprising at least two sleeves, an inner sleeve being a sliding fit within an outer sleeve and the outer sleeve being a sliding fit within a supporting member the two sleeves being rotatable relative to one another and relative to the supporting member, the inner and outer surfaces of each sleeve being cylindrical but non-parallel.

5. In a device for altering the inclination of an axis, at least two sleeves comprising an inner sleeve which is a sliding fit within the bore of an outer sleeve, the outer sleeve being a sliding fit within a mounting member, the two sleeves being rotatable relative to one another with their adjacent surfaces in sliding contact and the outer sleeve being rotatable within the mounting member, the adjacent surfaces of the outer sleeve and the mounting member being in sliding contact, the inner and outer surfaces of each of the two sleeves being cylindrical but non-parallel.

6. In a device for altering the inclination of an axis, comprising a supporting member having a passage therethrough, a sleeve fitting within the passage and rotatable therein, a second sleeve within the bore of the first sleeve and rotatable therein, the inner and outer surface of each sleeve being a surface of rotation, the axis of the inner and outer surfaces of each sleeve being at an angle to one another whereby relative rotation of the sleeves causes variation in the inclination of the axis of the inner surface of the inner sleeve.

7. A bearing alignment adjuster comprising three sleeves rotatable one within the other, the outer sleeve being fixed, the intermediate sleeve being a sliding fit within the outer sleeve and the inner sleeve, a sliding fit within the intermediate sleeve, the inner and outer surfaces of the inner and intermediate sleeves being cylindrical but non-parallel.

8. A bearing alignment adjuster comprising three sleeves, a fixed outer sleeve, an intermediate sleeve within the outer sleeve, an inner sleeve within the intermediate sleeve, the interior surface of the outer sleeve, the interior and exterior surface of the intermediate sleeve and the exterior surface of the inner sleeve being surfaces of revolution, the interior and exterior surfaces of the intermediate sleeve being non-parallel and the interior and exterior surfaces of the inner sleeve being cylindrical but non-parallel.

References Cited in the file of this patent
FOREIGN PATENTS

| | | |
|---|---|---|
| 139,363 | Great Britain | Mar. 4, 1920 |
| 374,593 | France | Apr. 22, 1907 |